United States Patent [19]
Bernhardt et al.

[11] 3,887,860
[45] June 3, 1975

[54] FUSELESS INVERTER

[75] Inventors: Thomas Joseph Bernhardt, Racine; Frank N. Klein, Kenosha, both of Wis.

[73] Assignee: Eaton Corp., Cleveland, Ohio

[22] Filed: Jan. 15, 1972

[21] Appl. No.: 306,521

[52] U.S. Cl. .............. 321/14; 307/31; 307/33 SC; 307/38; 307/50; 321/45 C
[51] Int. Cl. .......................................... H02h 7/10
[58] Field of Search ....... 317/16, 31, 33 SC, 36 TD, 317/38, 50; 321/11, 14, 45 C

[56] References Cited
UNITED STATES PATENTS

| | | | |
|---|---|---|---|
| 2,532,108 | 11/1950 | Lamm | 321/11 |
| 2,534,036 | 12/1950 | Lamm | 321/11 |
| 2,585,796 | 2/1952 | Lamm | 321/13 |
| 3,155,879 | 11/1964 | Casey | 317/36 TD |
| 3,491,370 | 1/1970 | Donner | 317/33 SC |
| 3,530,360 | 9/1970 | Relation | 317/33 SC |
| 3,558,982 | 1/1971 | Greenwood | 317/33 SC |
| 3,558,983 | 1/1971 | Steen | 317/33 SC |
| 3,569,819 | 3/1971 | Martzloff | 321/14 X |
| 3,579,036 | 5/1971 | McCoy | 317/33 SC |
| 3,609,508 | 9/1971 | Grazhdansky et al. | 321/13 X |
| 3,611,108 | 10/1971 | Yokohama | 321/11 |
| 3,622,862 | 11/1971 | Boksjo | 321/11 |
| 3,662,250 | 5/1972 | Piccone | 321/11 |
| 3,684,936 | 8/1972 | Graf | 321/11 X |
| 3,760,258 | 9/1973 | Percorini | 321/11 |

Primary Examiner—R. N. Envall, Jr.
Attorney, Agent, or Firm—Teagno & Toddy

[57] ABSTRACT

A fault protection system for static inverters protects the SCRs of the static inverters from damage due to "shoot-through" and other faults without relying on fuses. The fault protection system also clears certain types of faults without shutting down the system so as to necessitate manual resetting. An impedance is inserted in series with an input portion of the power circuit. A voltage almost equal to line voltage can develop across the impedance when a heavy fault current occurs. Switchable shunt circuits are provided for sharing the fault current; they are switched into conduction when a fault is sensed by a fault sensing circuit. The system automatically attempts to resume normal operation after a short time, but if normal operation is still impossible because of continued existence of the fault, a contactor shuts down the system altogether. Fuses may be used for back-up protection if desired.

27 Claims, 4 Drawing Figures

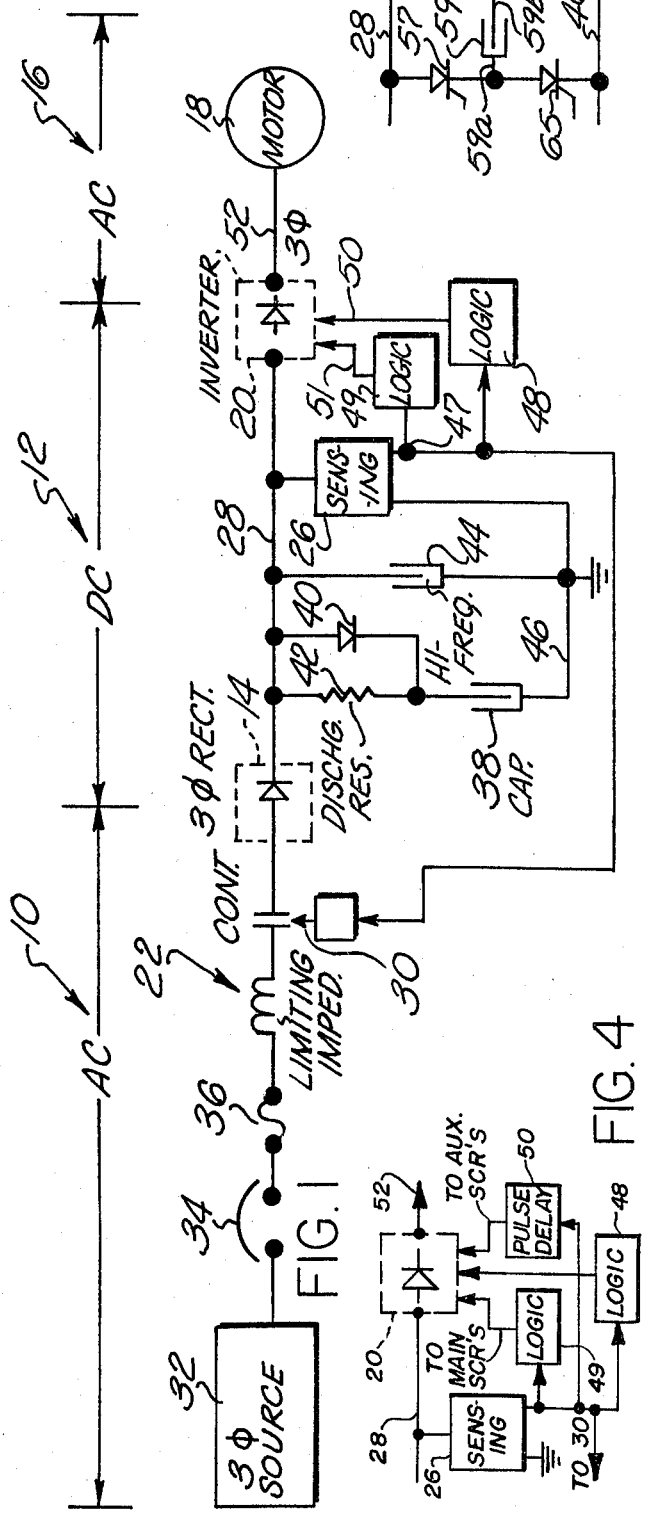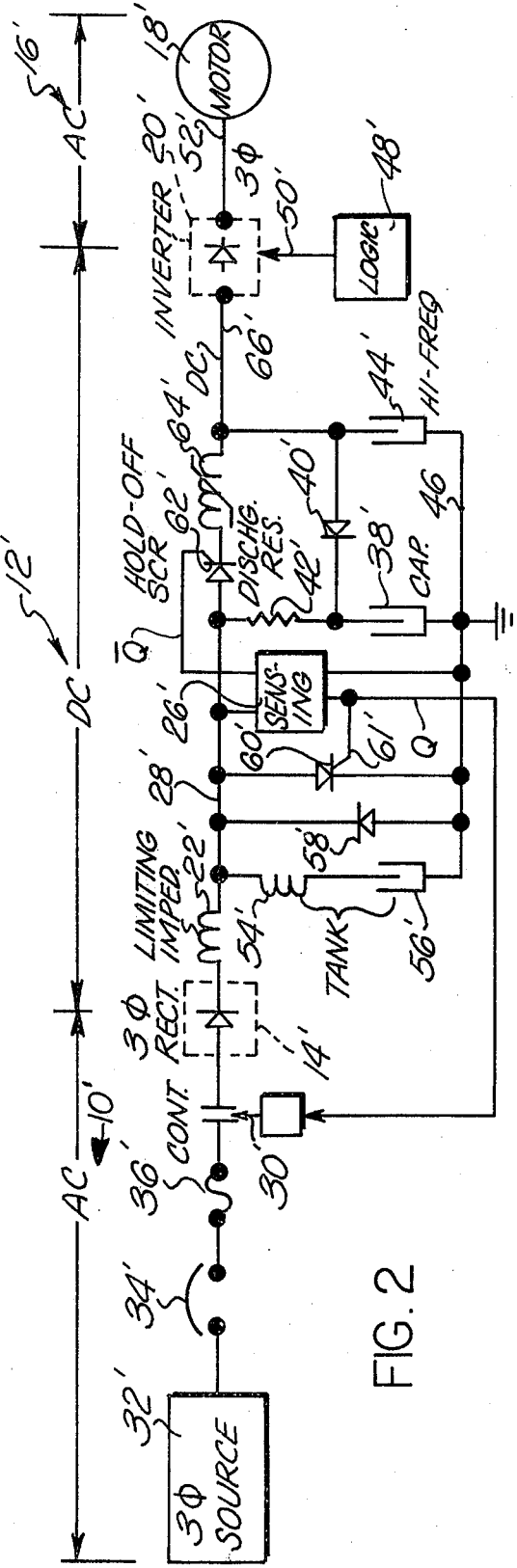

FUSELESS INVERTER

Static inverters have been widely employed in the prior art to convert DC electrical power to single phase or polyphase AC power. One class of static inverters for this purpose utilizes silicon controlled rectifiers (SCRs) to perforom the inversion, by switching the DC power lines in sequence to different AC power lines, which are the output lines of the static inverters. The sequential switching operations performed by the SCRs are controlled by a logic circuit which supplies electrical pulses to a gate electrode of each SCR. Upon being gated into conduction by a pulse from a logic circuit an SCR conducts for a fraction of a cycle of the output frequency, and then is turned off with the aid of a commutating circuit which back-biases the cathode and anode electrodes of the SCR momentarily. The commutating circuits often employ auxiliary SCRs and capacitors for turning off the main SCRs.

If, contrary to the desired sequence of operation, an SCR is gated into conduction before another one of the SCRs connecteed to the same AC line is turned off by the commutating circuit, the two conducting SCRs may cause a short circuit from the positive DC power line to the negative DC power line. A short circuit of this type, which is sometimes referred to as a "shoot-through," can destroy one or more of the SCRs if the short circuit current I continues longer than a time T, the maximum permissible short circuit exposure of SCRs being related to the product of $I^2 \times T$. A short circuit of this type causes an increase in current flowing at the DC power bus and thus results in a decrease of DC voltage on the DC power bus by an amount which depends upon the magnitude of the fault current and the impedance of a source which supplies power to the DC power bus.

SCRs have relatively low thermal capacities, and very fastacting fuses have been developed for protecting them against destruction when shoot-throughs or other types of short circuit faults occur. The fast-acting fuses are relatively expensive and their availability is limited, and in some cases they burn out frequently, disabling the entire inverter system until they can be manually replaced. This invention permits very rapid restoration of an inverter system, and protects the SCRs and other components of the circuit reliably and without the inconvenience of burning out of fuses.

In accordance with the invention, current is diverted from the main load semiconductor devices, e.g., SCRs, upon the occurrence of a fault such as shoot-through. In a preferred form of the present invention the fault is sensed by a voltage sensing device which provides a signal that initiates the diversion of the current from the main load SCRs, and preferably activates circuitry for breaking the main power supply in the event that the signal indicating a fault is maintained for a predetermined time. The invention also contemplates the use of a switching device such as a semiconductor switch which is rendered non-conductive upon the detection of a fault. Preferably, the switching device is an SCR which is rendered nonconductive by activating a shunt circuit connected across the SCR and inverter bridge to momentarily shunt the fault current and commutate the switching device and the SCRs of the inverter bridge. The shunt circuit may be opened and the switching device again rendered conductive to resume normal operation in case the fault has been cleared. If the fault is found still to remain, the sensing device preferably activates the circuitry interrupting the main power supply shortly thereafter. Fuses are relied upon only for back-up protection if at all.

Accordingly, one object of the present invention is to provide apparatus for use with static inverters to protect the inverter and equipment associated with it from damage due to faults, and to make it easier to recover from some faults when they do occur.

Another object is to prevent the burning out of fuses upon the occurrence of certain types of faults, to prevent unnecessary nuisance shutdowns of static inverter equipment, and to eliminate the labor and expense incurred in replacing fast-acting fuses in SCR inverter equipment.

Still another object is to provide load equipment that is connected to the output of the static inverter from damage due to faults and to prevent the destruction or degradation of rectifier components which supply power from an AC power line to a DC bus due to excessive current flow in the rectifiers resulting from faults on the DC bus or in an inverter connected to the DC bus or in inverter loads, or from faults initially occurring in the rectifiers themselves.

Yet another object is to provide apparatus which will, without manual intervention, attempt to restore an inverter system to normal operation after a fault has been detected and to shut down the system only upon a second detection of a fault following the attempt to restore normal operation.

A further object is to limit disruption of a power source by limiting the severity of fault currents which are drawn from it.

An additional object is to provide apparatus which can be employed in conjunction with fuse protection if desired to achieve a minimum number of nuisance shutdowns simultaneously with a maximum of safety.

A still further object is to provide a system for interrupting altogether the flow of power from a power source to SCRs and to the electrical load of an inverter if a fault remains beyond a predetermined time.

Further objects and features of the invention will become apparent upon consideration of the description, claims and drawings which follow herein.

FIG. 1 is a simplified circuit block diagram of one form of the preferred embodiment of the invention, with most circuits being represented by a single-line diagram.

FIG. 2 is a simplified circuit block diagram showing a second form of the preferred embodiment of the invention, with most circuits represented as a single line diagram.

FIG. 3 is a circuit diagram of one phase of a particular form of an inverter.and commutation portion of the circuits of FIGS. 1 and 2.

FIG. 4 is a fragmentary block diagram similar to FIG. 1 except showing the location of a pulse delay circuit that is employed in a form of the preferred embodiment.

Two specific forms of the preferred embodiment of the present invention are described herein in detail in FIGS. 1 and 2. Both forms illustrate the use of the invention in a system consisting of an AC input section 10 or 10' receiving power from a power source, a DC section 12 or 12' which receives its power from the first AC section after conversion by a three-phase bridge rectifier 14, or 14' and a second AC section 16 or 16' including a motor 18 or 18' which receives its power from the DC section 12 or 12' through the operation of a static inverter 20 or 20'. Both embodiments include a series-connected impedance 22 or 22' in either the first AC section 10, 10' or the DC section 12, 12' for limiting fault currents to a safe value. Both embodiments also have an arrangement for diverting part of the current in the DC section awaya from an SCR within the static inverter 20, 20' which is experiencing a shootthrough type of short circuit. Both embodiments also have a voltage sensing device 26, 26' for detecting an unusually low voltage in the DC section 12, 12'. The device 26 or 26' is preferably a conventional static undervoltage sensing circuit such as is described in U.S. Pat. No. 3,522,481 issued Aug. 4, 1970, wherein it is identified as a "low voltage sensing means 13", or such as is described in U.S. Pat. No. 3,740,738 issued June 19, 1973, entitled "Undervoltage Trip Circuit for Circuit Breaker." The undervoltage sensing device 26' differs from the undervoltage sensing device 26 in that the device 26' includes a conventional inverter for providing not only an asserted output signal but a negated output signal also. Upon an occurrence of a fault such as a shoot-through in SCRs of the inverter 20, 20', the voltage in the DC section decreases and the voltage sensing device 26, 26' puts the shunt circuit equipment into operation to relieve the endangered SCR of excessive current. After the undervoltage indicating signal has persisted for a time, a slow-opening contactor 30 30' to disconnect the power source 32, 32' if the fault persists. Other actions of the equipment are discussed below in connection with each form of the preferred embodiments.

The first form of the preferred embodiment of the invention, which is shown in FIG. 1, reduces a fault current through initially conducting SCRs in the inverter 20 by turning on all of the other SCRs in the inverter so that they share the fault current, thereby reducing the amount of current flowing in the initially conducting SCR to a temporarily safe level. In one version (FIG. 4), an attempt is then made to clear the fault. If the fault remains, the contactor 30 finally disconnects the power source.

The preferred embodiment of FIG. 1 can best be understood by first considering its normal mode of operation and thereafter considering its operation under fault conditions. In normal operation, three-phase AC power from the power source 32 passes through either a circuit breaker or a disconnect 34 and fuses 36, in each of the three-phase power lines. The current proceeds through a fault current limiting impedance 22 and the closed contacts of the contactor 30 and enters the three-phase bridge rectifier 14. The rectifier 14 is of conventional design; it converts three-phase AC current which it receives, into direct current which it supplies to a DC bus 28.

A filter capacitor 38 is charged from the DC bus 28 through a diode 40. Connected in parallel with the charging diode 40 to the filter capacitor 38, is a current limiting discharge resistor 42, which provides a path through which the filter capacitor 38 discharges when the voltage on the DC bus 28 is lower than the voltage stored on the capacitor 38. An additional filter capacitor 44, having smaller capacitance and faster response time than the filter capacitor 38, is connected from the positive DC bus 28 to the ground line 46 to filter relatively high-frequency components of the voltage on the bus 28.

Also connected between the DC bus 28 and the ground line 46 is the voltage sensing device 26, which recognizes the existence of a fault by detecting that the voltage on the bus 28 is less than a predetermined level. The voltage sensing device 26 controls the opening and closing of the contacts 30 and also transmits an electrical signal over lines 47 to logic circuits 48 and 49.

The logic circuit 48 controls the firing times of SCRs in the inverter module 20 under normal fault-free operating conditions, by means of signals applied to interconnecting lines 50.

The logic circuit 49 controls the firing of SCRs in the inverter 20 by putting signals on interconnecting lines 51 whenever the sensing device 26 indicates that a fault exists. In normal operation the voltage sensing device 26 produces signals for use by the contactor 30 and to enable the circuit 48 so as not to interrupt the conduction of current through the contacts 30 nor to interfere with normal cyclical firing of the SCRs in the inverter 20 by the logic circuit 48.

Output power from the inverter 20 is applied to three-phase lines 52 for driving the motor 18. In normal operation the positive DC bus 28 is connected in sequence to each of the three lines 52 for delivering positive lobes of AC voltage to the three-phase motor 18. A separate SCR is connected to each of the three-phase lines 52 from the positive DC bus 28 for performing these sequential switching operations. Other SCRs in the inverter 20 connect a ground potential from line 46 sequentially to each of the three lines 52. In normal operation, the conduction intervals of the SCRs that connect to the ground line 46 are offset, as to phase, from the conduction intervals of the SCRs that are connected to the positive DC bus 28. In this way, the logic circuit 48 switches the SCRs of the inverter 20 on (that is, into conduction), at correct times to produce a set of three-phase voltages on the lines 52 which operate the motor 18. In normal operation the SCR of inverter 20 which connects from the positive DC bus 28 to any particular one of the three lines 52 is never conducting at the same time as the SCR which connects from the ground DC power line 46 to that same one of the three lines 52.

The voltage drop across the fault current limiting impedance 22 is a small percentage of the incoming line voltage from source 32 when there is no fault because the current then in the impedance 22 is small compared with fault currents.

In the event of a fault such as a shoot-through short circuit in the inverter 20, the protection system, which is the subject of this invention, comes into play. A shoot-through short circuit in the inverter 20 can occur when, for example, an SCR is conducting current from the positive bus 28 to one of the three lines 52 and at the same time another SCR, which is connected from that same one of the lines 52 to the ground line 46, is also conducting. This abnormal condition may occur, for example, when the SCR that is connected to the ground line 46 starts to conduct before the SCR that is connected from the positive DC bus 28 is turned off, the two SCRs in question being connected to the same one of the three lines 52.

Simultaneous conduction of such a pair of SCRs creates a short circuit from the positive DC bus 28 to the ground line 46, which causes a very heavy current flow from the source 32, through the fault current limiting impedance 22, through the three-phase bridge 14, to the inverter 20. This unusually large fault current causes an abnormally large voltage drop in the fault current limiting impedance 22, so that the voltage on the DC bus 28 decreases to a very low voltage as measured with respect to the ground line 46. Thereupon, the voltage sensing device 26 detects the low voltage on the DC bus 28 and transmits a signal over the lines 47 to the logic circuits 48 and 49. The circuit 49 can be any conventional circuit for fanning out the signal from voltage sensing device 26 to the SCRs of the inverter 20. This signal disables logic circuit 48 and enables logic circuit 49 to trigger all of the SCRs of the inverter 20 into conduction, so that the pairs of SCRs that are associated with the other two lines of the three phase lines 52 provide parallel fault paths in which current then flows from the DC bus 28 to the ground line 46. Thus, instead of one pair of SCRs, namely, the pair which initiated the shoot-through, having to carry all of the fault current, three parallel paths, each comprising two SCRs in series, share the fault current. No one pair of SCRs need carry the entire current, whose total amount is limited by the impedance 22. Addition of the two extra parallel paths of SCRs in parallel with the shoot-through SCRs does not significantly increase the total fault current, because the impedance of the short-circuiting SCRs is so small compared with the impedance of the fault limiting impedance element 22 that the magnitude of the fault current is determined almost entirely by the fault current limiting impedance element 22. Short-circuit faults at the load 18 also cause all of the SCRs to be turned on.

Ordinarily a contactor such as contactor 30 would not be sufficient to protect the system because its 20 millisecond operation time is so slow that the short-circuited SCRs in the inverter module 20 would be destroyed by the fault current before the contactor 30 would interrupt the current. With the present invention, however, the SCRs in the inverter 20 are not destroyed by the short circuit current because the fault current limiting impedances 22 are properly proportioned to avoid exceeding the $I^2T$ limit of any SCR when all six of the SCRs conduct simultaneously for only 20 milliseconds. Thus, upon occurrence of a fault, the SCRs are protected from damage, no fuses need be replaced, and in the case of faults that are cleared within twenty milliseconds it is not even necessary for an operator to reset the control circuit of contacter 30 manually.

In a system in which auxiliary SCRs are provided in the inverter 20 for commutating the main SCRs, the auxiliary SCRs may be connected in such a way as to be capable, when all of them are fired into conduction, of conducting current from the positive DC bus to the ground line. Hence if desired, some or all of the auxiliary SCRs can also be gated into conduction upon the occurrence of a fault, at the time that all of the other main SCRs are gated on, as in the embodiment of FIG. 1. This reduces the fault current carried by any pair of SCRs to a still lower value, or, alternatively, permits the use of a smaller current limiting impedance 22, so that the load regulation is less degraded by the fault current limiting impedance 22 during normal operation of the inverter equipment. For this type of firing of the auxiliary SCRs, the commutating circuit must be arranged in a manner known in the art to permit simultaneous firing of both SCRs of a pair of auxiliary SCRs.

A minor modification of the system described above, to which a modification FIGS. 1, 3, and 4 apply, enables many shoot-through faults to be cleared without shutting down the system as a whole. In the modified form, when a fault is sensed by the sensing device 26, all of the main SCRs of the inverter 20 are fired, but not the auxiliary SCRs. The current-limiting impedance 22 is large enough that, with fault current sharing among the main SCRs, the fault current in the main SCRs is less than the peak commutating level. Shortly after all of the main SCRs are gated into conduction, all of the auxiliary SCRs have gating pulses applied to their gate electrodes from a pulse delay circuit 50, FIG. 4. At that time, only one auxiliary SCR in each phase is forward biased, FIG. 3, the other being reverse biased by a change on its commutation capacitor and by the short circuit existing from the DC bus 28 to the ground line 46 because of the main SCRs. Upon being pulse gated, therefore, only one auxiliary SCR in each pulse will turn on and commutate its corresponding main SCR. This will clear the shoot-through fault, if the fault which caused the shoot-through to start has vanished in the meantime. Operation of the system will then continue normally without any shutdown and without requiring any manual assistance. If the firing of the auxiliary SCRs fails to clear the fault, the sensing device 26 opens the contacts of the contactor 30, 20 milliseconds after the fault started.

The modification system of FIG. 4 described in the preceding paragraph can be summarized as follows: It is an electrical system for receiving power from an electrical source comprising a static circuit means in the form of inverter 20 including a plurality of semiconductor means in which start of current conduction is controllable for inverting DC to AC, sensing means 26 for detecting a fault indicating a current overload and producing a signal thereupon, and control means comprising logic circuit 49 responsive to said signal for initiating current conduction, upon occurrence of the fault, in a greater number of said semiconductor means than normally simultaneously conduct current, and wherein said plurality of semiconductor means of the inverter comprises main semiconductor means 53, 55 for inverting the power and auxiliary semiconductor means 57, 65 for commutating off said main semiconductor means upon conduction of said auxiliary semiconductor means, and wherein said control means further includes means comprising pulse delay circuit 50 for initiating current conduction in at least one of said auxiliary semiconductor means after a time interval following initiation of conduction in those ones of said greater number that are main semiconductor means, to enable normal inverter operation to be resumed without shutdown if the fault terminates, and further comprising a shutdown device, i.e. contacter 30, responsive to said signal and connected to interrupt power flow from the source to said static inverter 20 when said fault is present for a predetermined length of time.

For the latter mode of operation as just described, one phase of the three-phase inverter 20 is shown in FIG. 3; the other two phases are identical to it. Two main SCRs 53, 55 are connected to one phase line 52a from the positive bus 28 and the ground line 46 respectively. In normal operation only one of the main SCRs 53, 55 conducts at any one time. At the end of the desired conduction time of SCR 53, it is commutated off by pulse-gating an auxiliary SCR 57. When the auxiliary SCR 57 starts conducting it raises the voltage of one terminal 59a of a capacitor 59 approximately to the voltage of the bus 28. The other terminal 59b of the capacitor 59 thereupon is raised to a voltage more positive than that of the bus 28, extinguishing the main SCR 53, because the capacitor 59 was previously charged to a positive voltage on its terminal 59b with respect to its terminal 59a. A diode 61, which is back-connected across the SCR 53, conducts current to discharge the capacitor 59 through the auxiliary SCR 57 and through an inductor 63. The inductor 63 resonates with the capacitor 59 to put a positive charge on the terminal 59a of the capacitor 59 with respect to the terminal 59b. Thereafter, resonant diminution of the voltage across the inductor 63 causes the capacitor 59 to back-bias the auxiliary SCR 57, stopping conduction in it. The capacitor 59 now has a charge of suitable polarity to commutate off the main SCR 55 when another auxiliary SCR 65 is later gated into conduction.

The second form of the preferred embodiment of the invention, which is shown in FIG. 2, at first stops the flow of current to the SCRs of inverter 20' altogether when a fault starts, and passes the current instead through a shunt SCR 60' at a DC bus 28'. Shortly thereafter, it restores a limited amount of current flow to the inverter's SCRs in an attempt to resume normal operation, but if the fault does not vanish within a short time, a contactor disconnects the power source.

The second embodiment of the invention implements the same principles of the invention in a slightly different way than the first embodiment. Three-phase power enters the circuit of FIG. 2 from the source 32' and passes through the disconnect 34' and the three fuses 36'. The incoming current goes through contacts of the contactor 30' and into the three-phase bridge rectifier 14', where it is converted to DC current. The fault current limiting impedance 22' is connected in series from the output of the rectifier 14' to the positive DC bus 28'.

Connected between the DC bus 28' and a ground line 46' is a series combination of an inductor 54' and a capacitor 56', which together form an LC tank circuit for reactive storage of electrical energy. A diode 58', referred to herein as the back diode, is also connected from the positive DC bus 28' to the ground line 46', the anode of the diode 58' being at the ground line 46'. An SCR 60', referred to as the shunt SCR, has its anode connected to the DC bus 28' and its cathode connected to the ground line 46'. Its gate electrode is connected so as to be controlled by the voltage sensing device 26', which is sensitive to the amount of voltage on the DC bus 28' as measured with respect to the ground line 46'. The voltage sensing device 26' also has capability for controlling the contactor 30' and the gate terminal of another SCR 62', which is connected from the DC bus 28' to an inductor 64' so as to conduct conventional current to the inductor 64' when the SCR 62' is gated into conduction by the voltage sensing device 26'. The SCR 62' is referred to herein as the hold-off SCR.

The embodiment of FIG. 2 is provided also with a filter capacitor 38', a charging diode 40', a discharge resistor 42', and a high frequency filter capacitor 44', and of which serve the same functions as the correspondingly numbered circuit elements of the first embodiment. The inverter 20' is connected to the inductor 64' to invert the DC current which is received from the inductor 64' into three phase AC current flowing to a set of three-phase output lines 52'. The output lines 52' from the inverter 20' convey three phase AC power to the three phase AC motor 18' which is to be controlled. As was described in connection with the first embodiment, the inverter 20' includes SCRs, which are switched into conduction by signals generated by a logic circuit 48' and transmitted to the inverter 20' along some lines 50'.

During normal operation of the circuit of FIG. 2, current flows from the power source 32' through the bridge rectifier 14' and, with very little voltage drop, through the inductive impedance 22', which is carrying DC current to the bus 28'. During normal operation, the hold-off SCR 62' is conducting, and current flows through it and through the inductor 64' and a DC positive line 66' to the inverter 20'. The inverter 20' operates, ordinarily, without producing any short circuits between the DC positive line 66' and the ground line 46', and only a moderate amount of current is normally drawn through the fault current limiting impedance 22' and the inductor 64'. The voltage sensing device 26' maintains the hold-off SCR 62' and the contactor 30' in conducting conditions, and the shunt SCR 60' in a non-conducting condition during normal operation.

When a fault occurs in the system of FIG. 2, for example a shoot-through fault through a pair of SCRs of the inverter 20' such as was described above in connection with the first embodiment, an abnormally large current begins to flow toward the fault from the power source 32'. The rate of rise of the fault current is limited, however, by the inductance 22', even though that inductance is located in a DC circuit. Consequently the short circuiting effect of the shoot-through in the inverter 20' decreases the voltage at the DC bus 28' sufficiently to actuate the under-voltage sensing device 26'. The device 26' thereupon produces a signal on a gate electrode 61' of the shunt SCR 60' to trigger the shunt SCR 60' into conduction so that it short circuits the DC bus 28' to the ground line 46'. The hold-off SCR 62' stops conducting because its anode terminal has been short circuited to the ground line 46' by the shunt SCR 60'. The cathode terminal of the hold-off SCR 62' has a somewhat more positive voltage than the anode terminal after a short time because the voltage drop from the positive line 66' through the two SCRs that are shooting-through in series to the ground line 46' is somewhat greater than the single forward drop through the shunt SCR 60'. The voltage sensing device 26', when actuated, also transmits a non-conduction control signal to a gate electrode of the hold-off SCR 62'. The Q output signal produced by the undervoltage sensing device 26' (for controlling the hold off SCR 62') is therefore seen to be the inverse of the Q output signal produced by the undervoltage sensing device 26' (for controlling the shunt SCR 60' and the slow contractor 30). The holdoff SCR 62' will therefore be prevented from resuming conduction even after the voltage on the DC bus 28' goes positive again, as it will later do, because the voltage sensing device 26' has imposed a low potential on the gate electrode of the hold-off SCR 62' which prevents resumption of its anode current.

The SCRs of inverter 20' that were experiencing the shoot-through fault that started the trouble, have now been disconnected entirely from their source of DC power, namely bus 28', by the switching action of the hold-off SCR 62', and are therefore protected from being burned out by fault current. It should be noted in this regard that the high frequency filter capacitor 44' has such a small capacitance that it cannot store enough charge to burn out the shoot-through SCRs in the inverter 20', and that the larger capacitor 38' is prevented from discharging through the shoot-through SCRs because the hold-off SCR 62' is not conducting at this time.

The shunt SCR 60', in addition to providing a path for fault current flowing from the inductor 22', also provides a discharge path for the LC tank capacitor 56' and for the filter capacitor 38'. The capacitor 56' transfers its electrical charge through the tank circuit inductor 54' to the DC bus 28', and thence through the shunt SCR 60' to the ground line 46'. The flow of this charge through the tank circuit inductor 54' is a current which stores energy in a magnetic field of the inductor 54'. When the electrical charge that was initially present on the capacitor 56' has been depleted by current flow out of it, the current flow does not stop because reductions in that current create a reactive voltage across the inductor 54' which is positive at the end of inductor 54' which is connected to the DC bus 28', so that the voltage of inductor 54' is of such a polarity as to continue the flow of current from the capacitor 56'. This results in a negative charge, after a time, on the ungrounded terminal of the capacitor 56'.

When the current in the inductor 54' finally does decrease to zero, the capacitor 56' has a relatively great negative charge on its ungrounded plate, and it begins discharging in reverse, back through the back diode 58' and the inductor 54'. This current flow in the back diode 58' back-biases the shunt SCR 60', which is connected in parallel with the back diode 58' but with contrary polarity. The shunt SCR 60' thereupon ceases its forward conduction. The tank circuit 54', 56' takes over the role of accepting current coming from the impedance 22', which previously was flowing through the shunt SCR 60'. The capacitor 56' is now being recharged to a positive voltage on its ungrounded plate.

After the capacitor 56' has again become charged to a great enough positive voltage to exceed the threshold voltage of the voltage sensing device 26', the hold-off SCR 62' is again gated into conduction by the device 26'. The shunt SCR 60' remains non-conducting. In the meantime, the fault in the inverter 20', which initiated the whole sequence of fault clearing actions, may have been cleared. If it has, the logic circuit 48' resumes gating of the SCRs of the inverter 20' in a proper sequence, and normal operation of the entire equipment is re-established.

It should be noted that the fuses 36' have not burned out because their I²xT rating has not been exceeded. These fuses are a fast acting type chosen so as to clear the fault if it persists for about 40 milliseconds. Moreover, no manual intervention was necessary. The fault was cleared because the SCRs of the inverter 20' that had been shooting through, were turned off by the hold-off SCR 62', and they did not resume conduction until they were gated on at proper times by the logic circuit 48'.

If, however, the fault persists after the tank circuit capacitor 56' has recharged to a sufficient level to cause the voltage sensing device 26' to gate the hold-off SCR 62' into conduction again, the voltage on the DC bus 28' will again be decreased to a relatively low value by the rise of fault current, which causes a great inductive voltage drop on the impedance 22'. The voltage sensing device 26' will again sense the fault by detecting a recurrence of the low voltage on the DC bus 28', and will again start the shunt SCR 60' conducting, which will stop the hold-off SCR 62' from conducting. The events which were described above in connection with the shoot-through fault all occurred in less than 20 milliseconds after the start of the fault, and the voltage sensing device 26' has not as yet caused the slow contactor 30' to open its contacts. This time, after 20 milliseconds the contactor 30' will finally be completely actuated by the voltage sensing device 26' to interrupt power flow from the source 32', shutting down the equipment.

In cases like the one just described, in which the fault persists, the voltage sensing device 26' actuates the contactor 30' upon the second occurrence of a low voltage on the DC bus 28' and not upon the first occurrence because the times during which the low voltage exists during the first and second times together accumulate to 20 milliseconds, which is a sufficient time to actuate the contactor 30' upon the second occurrence. The circuit of contactor 30' is resettable. In a case wherein the fault is so persistent as to result in a shutdown of the system by actuation of the contactor 30', it is desirable to make it necessary for an operator to reset the circuit in order to start it again as he must herein. He may have to investigate the cause of the fault, which could be a short circuit on the motor lines 52' or in the motor 18' or could, of course, be a shoot-through fault such as was used as an example in the foregoing description. In any event it is not necessary to replace a fuse 36'. Moreover, the protective elements namely, impedance 22', shunt SCR 60' and hold-off SCR 62', were so effective as to permit an automatic attempt to restore the system to normal operation before disconnecting the system from the power source 32'.

A starting circuit, not shown, is provided for starting the equipment from a de-energized condition by energizing the contactor 30' to close its contacts even though there is initially a zero voltage on the DC bus 28'. The starting circuit overrides the voltage sensing device 26' during start up.

A modified form of the circuit of FIG. 2 would eliminate the tank circuit elements 54' and 56', and the back diode 58'. Upon occurrence of a fault and modified circuit would shut down the system by opening the contactor 30' without first attempting to restore manual operation.

Because of the fault current limiting impedance 22 or 22', current drawn from the power source 32 or 32' is not as great during a fault as it would be in the absence of those impedance elements, such as in a prior art system that is protected only by fast-acting fuses.

It is not necessary to relinquish the protection provided by fuses in order to avail oneself of the convenience of protection by the present invention, of course.

The present invention has capability for establishing much closer tolerances on fault protection than are available with fuses, because the fault severity at which the protected circuits go into action can be set by repeated operation of the fault circuits of the present invention, while repeated operation of fuses is, of course, impossible because one operation at an actuating current level destroys the fuse.

Moreover, the present invention provides static inverter apparatus which is simple to trouble-shoot because shoot-throughs can be provoked in the SCR crcuits repeatedly in order to locate a defect, without damaging the equipment.

Although the invention has been described in terms of two specific forms of the preferred embodiment, it is clear to persons who are skilled in the art to which the invention pertains that numerous embodiments in addition to those described may be made in the light of the teachings of the invention.

The fault current limiting impedances 22 or 22' could be resistors instead of inductors such as are shown, although the inductors are more efficient. Also it is clear that certain refinements of the circuit of FIG. 2 could be employed in the circuit of FIG. 1, and vice versa, in a variety of combinations. The SCR 60' of FIG. 2 could serve both as a protective element during faults, as described above, and as a commutating element for normal inverter operation.

In some unusual situations it may be desirable to make the impedance 22 large enough to limit the fault current to such a low level that, with load sharing by the SCRs, the SCRs could carry the fault current continuously. In such a situation the contactor 30 could be omitted.

It will be clear to those skilled in the art that the present invention is useful also in other circuit configurations for protecting semiconductors. A few examples of the numerous other circuit configurations are DC motor drive systems, and systems for driving loads other than motors.

What is claimed is:

1. An electrical system for receiving power from a DC electrical source comprising a static inverter means including a plurality of main semiconductor means for inverting the power and auxiliary semiconductor means for commutating off said main semiconductor means upon conduction of said auxiliary semiconductor means, sensing means for detecting an abnormality indicative of a current overload fault and producing a signal thereupon, and control means responsive to said signal for initiating current conduction upon occurrence of the fault in at least one of said auxiliary semiconductor means to complete an additional shunt current path to share current flowing to said static inverter means.

2. An electrical system as defined in claim 1 and wherein said auxiliary semiconductor means comprises commutation semiconductor means that are adapted and arranged to commutate off said main semiconductor means periodically and routinely during normal inverter operation in the absence of a fault.

3. An electrical system as defined in claim 1 and further comprising means responsive to said signal to interrupt power flow to said static inverter when said fault is present for a predetermined length of time.

4. An electrical system as defined in claim 1 and wherein said control means further comprises means responsive to said signal to initiate current conduction in addition in at least one previously non-conducting one of said main semiconductor means to share current flowing to said static inverter means.

5. An electrical system for receiving power from a DC electrical source comprising a static inverter means including a plurality of semiconductor means in which start of current conduction is controllable for inverting DC to AC, sensing means for detecting a fault and producing a signal thereupon, and control means responsive to said signal for initiating current conduction, upon occurrence of the faults, in a greater number of said semiconductor means than normally simultaneously conduct current, and wherein said plurality of semiconductor means comprises main semiconductor means for inverting the power and auxiliary semiconductor means for commutating off said main semiconductor means upon conduction of said auxiliary semiconductor means, and wherein said control means further includes means for initiating current conduction in at least one of said auxiliary semiconductor means after a time interval following initiation of conduction in those ones of said greater number that are main semiconductor means, to enable normal inverter operation to be resumed without shutdown if the fault terminates.

6. An electrical system as defined in claim 5 and further comprising a shutdown device responsive to said signal and connected to interrupt power flow to said static inverter when said fault is present for a predetermined cumulative length of time.

7. An electrical system as defined in claim 6 and wherein said shutdown device comprises a delayed-opening contactor responsive to open when said signal has existed for said predetermined length of time.

8. An electrical system for transmitting power from an electrical DC source to a load comprising static circuit means having an input connected to said source and including at least one main load current semiconductor in which load current conduction is periodically started and extinguished for converting DC to AC, protection means for sensing a fault producing a current overload in said static circuit means and for diverting current from each conducting main semiconductor and for thereafter commutating off any conducting main semiconductor, said protection means comprising first switching circuit means for momentarily establishing a shunt current across said input on the occurrence of a current overload to divert load current from said static circuit means and second switching means intermediate said first switching circuit means and said static circuit means and responsive to the establishment of said shunt current to block current conduction to said static circuit means and responsive to the reestablishment of source voltage across said static circuit means on the cessation of shunt current to re-establish load current to said static circuit means, and further comprising shutdown means for interrupting power flow to said static circuit means when a fault persists for a predetermined time.

9. An electrical system for transmitting power from an electrical DC source to a load comprising static circuit means having an input connected to said source and including at least one main load current semiconductor in which load current conduction is periodically started and extinguished for converting DC to AC, protection means for sensing a fault producing a current overload in said static circuit means and for diverting current from each conducting main semiconductor and for thereafter commutating off any conducting main semiconductor, said protection means comprising switching circuit means for momentarily establishing a shunt current across said input on the occurrence of a current overload to divert load current from said static circuit means and second switching means responsive to the establishment of said shunt current to block current conduction to said static circuit means and responsive to the re-establishment of source voltage across said static circuit means on the cessation of shunt current to re-establish load current to said static circuit means, and wherein an impedance element is connected in series intermediate the source and said semiconductor.

10. An electrical system for transmitting power from an electrical DC source to a load comprising static circuit means having an input connected to said source and including at least one main load current semiconductor in which load current conduction is periodically started and extinguished for converting DC to AC, protection means for sensing a fault producing a current overload in said static circuit means and for diverting current from each conducting main semiconductor and for thereafter stopping current in a conducting main semiconductor comprising first switching means connected in shunt across said input for initiating shunt current flow on the occurrence of a fault to divert current from said static circuit means, and second switching means intermediate said source and said semiconductor for blocking current flow in each said main semiconductor to render the latter non-conductive on the occurrence of a fault, said protection means including time delay means for blocking said shunt current and rendering said second switching means conductive within a first predetermined time after said shunt current is established, and in which said time delay means comprises a tank circuit including a capacitor and an inductor across said input to resonate upon a fault, and a rectifier connected across said input for recharging said capacitor and poled to block current from said source, and said protection means includes sensing means comprising voltage sensing means responsive to produce a signal upon occurrence of a voltage across said input below a predetermined level, and further comprising a slow-opening contactor connected for interrupting electrical power flow to said static circuit means and responsive to said signal to interrupt said flow after said signal exists for a second predetermined cumulative time greater than said first predetermined time.

11. An electrical system for transmitting power from an electrical DC source to a load comprising static circuit means having an input connected to said source and including at least one main load current semiconductor in which load current conduction is periodically started and extinguished for converting DC to AC, protection means for sensing a fault producing a current overload in said static circuit means and for diverting current from each conducting main semiconductor and for thereafter commutating off any conducting main semiconductor, said protection means comprising switching circuit means for momentarily establishing a shunt current across said input on the occurrence of a current overload to divert load current from said static circuit means and second switching means responsive to the establishment of said shunt current to block current conduction to said static circuit means and responsive to the re-establishment of source voltage across said static circuit means on the cessation of shunt current to re-establish load current to said static circuit means, wherein said second switching means is a gatable avalanche type of semiconductor device gated off and on in response to the voltage input to said static circuit means and becoming non-conductive when the anode voltage of said device is reduced to substantially its cathode voltage upon start of said current.

12. An electrical system for transmitting power from an electrical DC source to a load comprising static circuit means having an input connected to said source and including at least one main load current semiconductor in which load current conduction is periodically started and extinguished for converting DC to AC, protection means for sensing a fault producing a current overload in said static circuit means and for diverting current from each conducting main semiconductor and for thereafter commutating off any conducting main semiconductor, said protection means comprising switching circuit means for momentarily establishing a shunt current across said input on the occurrence of a current overload to divert load current from said static circuit means and second switching means responsive to the establishment of said shunt current to block current conduction to said static circuit means and responsive to the reestablishment of source voltage across said static circuit means on the cessation of shunt current to re-establish load current to said static circuit means, and further comprising shutdown means for interrupting power flow to said static circuit means when a fault persists for a predetermined cumulative time, and wherein said shutdown means is a delayed-opening contactor in which a time delay occurs before interruption of said power flow.

13. An electrical system for transmitting power from an electrical DC source to a load comprising static circuit means having an input connected to said source and including at least one main load current semiconductor in which load current conduction is periodically started and extinguished for converting DC to AC, protection means for sensing a fault producing a current overload in said static circuit means and for diverting current from each conducting main semiconductor and for thereafter stopping current in a conducting main semiconductor, said protection means comprising voltage sensing means responsive to produce a signal upon occurrence of a voltage across said input below a predetermined level, said protection means further comprising first switching means connected in shunt across said input for initiating shunt current flow on the occurrence of a fault to divert current from said static circuit means, and second switching means intermediate said first switching means and said semiconductor for blocking current flow in each said main semiconductor to render the latter non-conductive on the occurrence of a fault, said protection means further including time delay means for blocking said shunt current following a first predetermined time after said shunt current is established whereby said DC voltage rises thereupon if said fault has ceased after said first predetermined time, said second switching means being responsive to said voltage sensing means to start conducting again when said fault has ceased after said first predetermined time.

14. An electrical system for supplying power to an ac load from a dc electrical source comprising static inverter means having an input connected with said dc source and having output terminals connected for delivering ac power to the load, said static inverter means comprising a plurality of main semiconductor means carrying load current and periodically rendered conductive and non-conductive at respective times to control the power to the load, sensing means for sensing the occurrence of a fault in said system and producing a signal thereupon, means for protecting said system comprising means responsive to said signal for diverting away from at least one main semiconductor means at least a portion of the current being conducted upon occurrence of the fault, time delay means responsive to the sensing of the fault by said sensing means for establishing a time delay following occurrence of the fault, means responsive to said time delay means for momentarily disabling said current-diverting means at the end of said time delay, control means for restoring normal operation upon said disabling in situations in which the fault has ceased during said delay and disconnect means controlled by an output from said sensing means for interrupting the supply of power for said inverter means in situations in which the fault has not ceased within a predetermined cumulative time but after said attempt to restore normal operation.

15. An electrical system as defined in claim 14 and wherein said means for diverting current comprises semiconductor means shunt-connected across said DC electrical source and seriesconnected semiconductor means intermediate said shunt connected semiconductor means and said plurality of main semiconductor means for disconnecting said input of said inverter from said DC source, and said means for momentarily disabling said current diverting means at the end of said time delay comprises commutating means for extinguishing conduction in said shunt-connected semiconductor means, and said control means for restoring normal operation upon said disabling comprises means for reconnecting said inverter input to said DC source.

16. An electrical inverter as defined in claim 13 in which said time delay means comprises a tank circuit including a capacitor in series with an inductor across said input and responsive to the shunt switching action of said first switching means upon a fault, and a rectifier connected across said input for recharging said capacitor and poled to block current from said source.

17. A method for protecting from fault damage an electrical static inverter which receives power from a source, inverts it with main semiconductors that are arranged to be commutated off by auxiliary commutation semiconductor means, and delivers AC power to a load comprising the steps of sensing the occurrence of a fault producing a signal thereupon, switching away from at least one of the main semiconductors at least a portion of its current in response to said signal, establishing a substitute current path in said auxiliary commutation semiconductor means for conducting said portion of current that was switched away from said main semiconductor, and interrupting the power to the inverter if the signal persists longer than a predetermined cumulative time.

18. A method for protecting a static inverter as defined in claim 17 and wherein said step of establishing a substitute current path upon a fault comprises establishing a substitute current path in auxiliary commutation semiconductor means that perform routine commutation of said main SCRs during normal inverting operation of said inverter in the absence of a fault.

19. An electrical system for supplying power to an AC load from a DC electrical source comprising static inverter means having an input connected with said DC source and having output terminals connected for delivering AC power to the load, said static inverter means comprising a plurality of main semiconductor means carrying load current and each periodically rendered conductive and non-conductive to control the power to the load, a plurality of auxiliary commutation semiconductor means for routinely commutating off said main semiconductor means during inverting operation in the absence of a fault, sensing means for sensing the occurrence of a fault in said system and for producing a signal thereupon, means for protecting said system upon a fault comprising means responsive to said signal for rendering conductive at least momentarily at least one of the non-conducting ones of said auxiliary commutation semiconductor means to complete an additional current path to divert away from at least one of said main semiconductor means a portion of the current being conducted therethrough upon occurrence of the fault, and disconnect means controlled by an output from said sensing means for interrupting the supply of power for said inverter means after a predetermined time and after said diverting away of said portion of said current.

20. An electrical system as defined in claim 19 and wherein said means for protecting said system further comprises means responsive to said signal for rendering conductive at least momentarily in addition at least one of the non-conducting ones of said main semiconductor means to divert away from at least one conducting one of said main semiconductor means a portion of the current being conducted therethrough upon occurrence of said fault.

21. An electrical system according to claim 19 wherein said disconnect means is a contactor.

22. An electrical circuit as defined in claim 19 wherein each main semiconductor means comprises a gatable avalanche type of semiconductor device.

23. An electrical system as defined in claim 21 and wherein said contactor comprises time delay contactor means for interrupting said supply of power after said signal from said sensing means has existed for said predetermined time.

24. An electrical system as defined in claim 14 and wherein said means for diverting current comprises means for producing conduction in the previously non-conductive ones of said main semiconductor means, and said means for momentarily disabling said current-diverting means at the end of said time delay comprises commutating circuit means for extinguishing conduction in said main semiconductor means, and said control means for restoring normal operation comprises logic circuit means for triggering said main semiconductor means in a normal non-fault sequence.

25. An electrical system for transmitting power from an electrical DC source to a load comprising static circuit means having an input connected to said source and including at least one main load current semiconductor in which load current conduction is periodically started and extinguished for converting DC to AC, protection means for sensing a fault producing a current overload in said static circuit means and for diverting current from each conducting main semiconductor and for thereafter commutating off any conducting main semiconductor, said protection means comprising switching circuit means for momentarily establishing a shunt current across said input on the occurrence of a current overload to divert load current from said static circuit means and second switching means responsive to the establishment of said shunt current to block current conduction to said static circuit means and responsive to the re-establishment of source voltage across said static circuit means on the cessation of shunt current to re-establish load current to said static circuit means.

26. An electrical system for supplying power to an AC load of at least one phase from a DC electrical source comprising static inverter means having an input connected with said DC source and having output terminals connected for delivering AC power to the load, said static inverter means comprising a plurality of main semiconductor means carrying load current and each periodically routinely rendered conductive and non-conductive to control the power to the load, a plurality of commutation semiconductor means for rendering said main semiconductor means non-conductive, sensing means for sensing the occurrence of a fault in said system and producing a signal thereupon, disconnect means controlled by an output from said sensing means for interrupting the supply of power for said inverter means after a predetermined time, means for protecting said system comprising means for rendering conductive at least one of said commutation semiconductor means per phase so as to render non-conductive at least one of said main semiconductor means per phase when the phase has a conducting main semiconductor means, and means for restoring conductivity routinely to said main semiconductor means before said predetermined time, whereby said disconnect means does not interrupt said supply of power.

27. An electrical system as defined in claim 26 and wherein said means for protecting further comprises means responsive to said signal for rendering conductive at least momentarily at least one of the non-conducting ones of said main semiconductor means to divert away from at least one conducting one of said main semiconductor means a portion of the current being conducted therethrough upon occurrence of the fault.

* * * * *

UNITED STATES PATENT OFFICE
CERTIFICATE OF CORRECTION

Patent No. 3,887,860    Dated June 3, 1975

Inventor(s) Thomas J. Bernhardt; Frank N. Klein

It is certified that error appears in the above-identified patent and that said Letters Patent are hereby corrected as shown below:

| | |
|---|---|
| In the Abstract: | "shot-through" should read ---"shoot-throughs"---. |
| Col. 1, line 6: | Correct spelling of ---perform---. |
| line 21: | Correct spelling of ---connected---. |
| Col. 2, line 15: | "provide" should read ---protect---. |
| Col. 5, line 38: | "would" should read ---could---. |
| line 48: | "contacter" should read ---contactor---. |
| Col. 6, line 19: | "pulse" should read ---phase---. |
| line 55: | "contacter" should read ---contactor---. |
| Col. 7, line 63: | "and" second occurrence should read -- all --. |
| Col. 10, line 49: | "and" should read ---the---. |
| line 51 & 52: | "manual" should read ---normal---. |
| Col. 11, line 6: | Correct spelling of ---circuits---. |

Signed and Sealed this eighteenth Day of November 1975

[SEAL]

Attest:

RUTH C. MASON
Attesting Officer

C. MARSHALL DANN
Commissioner of Patents and Trademarks